(12) United States Patent
Anantharaman et al.

(10) Patent No.: US 7,941,551 B2
(45) Date of Patent: May 10, 2011

(54) TUNNELING OF REMOTE DESKTOP SESSIONS THROUGH FIREWALLS

(75) Inventors: Sundar Anantharaman, Redmond, WA (US); Deepak Rao, Bellevue, WA (US); Xin Guo, Mill Creek, WA (US); Dhruv Chopra, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 176 days.

(21) Appl. No.: 12/392,902

(22) Filed: Feb. 25, 2009

(65) Prior Publication Data

US 2010/0217874 A1  Aug. 26, 2010

(51) Int. Cl.
G06F 15/16 (2006.01)
(52) U.S. Cl. .................. 709/228; 709/227; 709/229
(58) Field of Classification Search .............. 709/227, 709/228, 229, 223, 225, 226, 217–219, 238–244; 370/252, 255, 352, 291, 235, 236, 392, 503, 370/508, 516, 519, 260
See application file for complete search history.

(56) References Cited

U.S. PATENT DOCUMENTS

| 5,537,548 A | 7/1996 | Fin et al. | |
|---|---|---|---|
| 2003/0188001 A1 | 10/2003 | Eisenberg et al. | |
| 2007/0076729 A1* | 4/2007 | Takeda | 370/401 |
| 2007/0143858 A1 | 6/2007 | Hearty | |
| 2007/0291108 A1 | 12/2007 | Huber et al. | |
| 2008/0069011 A1 | 3/2008 | Sekaran et al. | |
| 2008/0080568 A1* | 4/2008 | Hughes et al. | 370/519 |
| 2009/0262668 A1* | 10/2009 | Hemar et al. | 370/260 |

OTHER PUBLICATIONS

J. Rosenberg, Interactive Connectivity Establishment (ICE): A Methodology for Network Address Translator (NAT) Traversal for the Session Initiation, Jun. 30, 2003, Internet Engineering Task Force (IETF), http://tools.ietf.org/html/draft-rosenberg-sipping-ice-01.*
"Techinline Remote Desktop", Retrieved at << http://www.techinline.com/ >>, Jul. 20, 2009, pp. 1-2.
"Office Communications Server 2007 R2 Desktop Sharing Architecture", Retrieved at << http://technet.microsoft.com/en-us/library/dd572758(office.13).aspx >>, Jul. 20, 2009, pp. 1-7.
"[MS-RTP]: Real-time Transport Protocol (RTP) Extensions", Retrieved at << http://download.microsoft.com/download/1/6/F/16F4E321-AA6B-4FA3-8AD3-E94C895A3C97/%5BMS-RTP%5D.pdf >>, Jul. 8, 2009, pp. 1-30.
Techinline Remote Desktop http://www.techinline.com/.
Office Communications Server 2007 R2 Desktop Sharing Architecture http://technet.microsoft.com/en-us/library/dd572758(office.13).aspx.
[MS-RTP]: Real-time Transport Protocol (RTP) Extensions http://download.microsoft.com/download/1/6/F/16F4E321-AA6B-4FA3-8AD3-E94C895A3C97/%5BMS-RTP%5D.pdf.

* cited by examiner

Primary Examiner — Wing F Chan
Assistant Examiner — Ruolei Zong
(74) Attorney, Agent, or Firm — Turk IP Law, LLC

(57) ABSTRACT

Endpoints are enabled to facilitate desktop and/or application sharing in enhanced communication systems using Session Initiation Protocol (SIP) and Remote Desktop Protocol (RDP) protocols by tunneling RDP packets through an Interactive Connection Establishment (ICE) channel built-in within the Real-time Transport Protocol (RTP), thus allowing RDP sessions to traverse Network Address Translators (NATs) or firewalls.

19 Claims, 7 Drawing Sheets

TUNNELING OF REMOTE DESKTOP SESSIONS THROUGH FIREWALLS

BACKGROUND

The proliferation of capabilities and services provided through communication devices by newer systems combine a variety of short range and long range communication capabilities over a number of networks including traditional phone networks, wireless networks, and similar ones. Telecommunication end devices as well as support devices and programs for such newer systems are more similar to computer networks than conventional telephone networks. Thus, a large number of capabilities may be added to those already provided by modern telecommunication devices and networks. For example, instant messaging, voice/video communications, and other forms of communication remote desktop or application sharing may be facilitated.

Signaling and session establishment in modern communication systems such as Unified Communication (UC) systems may be accomplished employing the Session Initiation Protocol (SIP). Remote Desktop Protocol (RDP) is a protocol that can be used for application and desktop sharing. The RDP packets are exchanged by tunneling through the Real-time Transport Protocol (RTP) protocol. Communication through these protocols may encounter problems when crossing network boundaries such as Network Address Translators (NATs) or firewalls.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to facilitating desktop and/or application sharing in enhanced communication systems using SIP and RDP protocols by tunneling RDP packets through an Interactive Connection Establishment (ICE) channel built-in within the RTP protocol further enabling incorporation of flow control with other modalities of a multimodal conversation.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
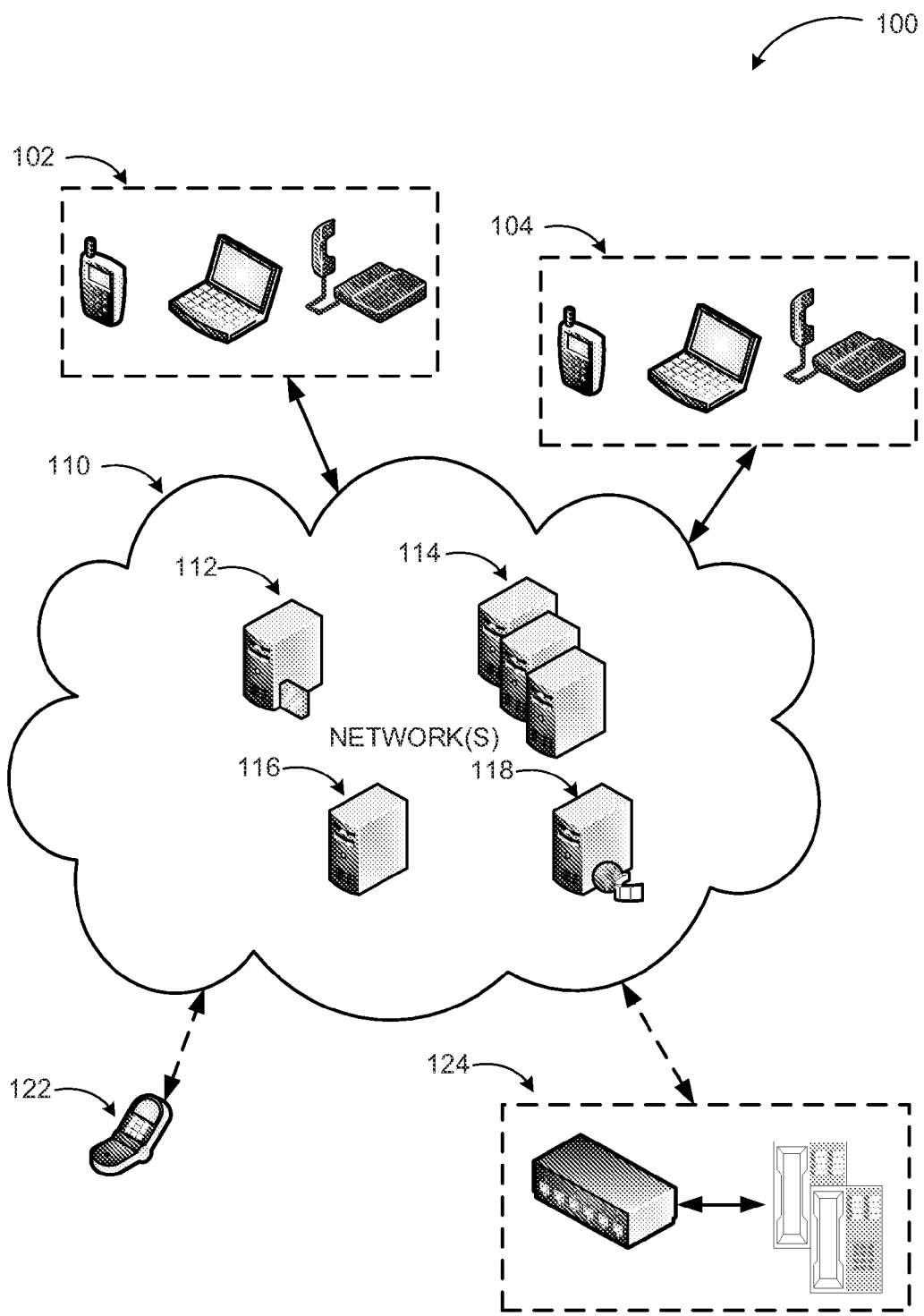
FIG. 1 is a diagram illustrating an example unified communications system, where embodiments may be implemented for exchange of subscriber information.

As briefly described above, desktop and/or application sharing may be facilitated by tunneling RDP packets through an ICE channel over multiple communication networks. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for facilitating desktop and/or application sharing over various networks. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below. Modalities or modes of communication refer to different types of communication such as email, instant message exchange, voice communication, video communication, etc. that may be facilitated individually or in an integral manner as part of a conversation.

Referring to FIG. 1, diagram 100 of an example unified communications system, where embodiments may be practiced, is illustrated. A unified communication system is an example of modern communication systems with a wide range of capabilities and services that can be provided to subscribers. A unified communication system is a real-time communications system facilitating instant messaging, presence, audio-video conferencing, and web conferencing functionality.

In a unified communication ("UC") system such as the one shown in diagram 100, users may communicate via a variety of end devices (102, 104), which are client devices of the UC system. Each client device may be capable of executing one or more communication applications for voice communication, video communication, instant messaging, application sharing, data sharing, and the like. In addition to their advanced functionality, the end devices may also facilitate traditional phone calls through an external connection such as through PBX 124 to a Public Switched Telephone Network ("PSTN"). End devices may include any type of smart phone, cellular phone, any computing device executing a communication application, a smart automobile console, and advanced phone devices with additional functionality.

UC Network(s) 110 includes a number of servers performing different tasks. For example, UC servers 114 provide registration, presence, and routing functionalities. Routing functionality enables the system to route calls to a user to anyone of the client devices assigned to the user based on default and/or user set policies. For example, if the user is not available through a regular phone, the call may be forwarded to the user's cellular phone, and if that is not answering a number of voicemail options may be utilized. Since the end devices can handle additional communication modes, UC servers 114 may provide access to these additional communication modes (e.g. instant messaging, video communication, etc.) through access server 112. Access server 112 resides in a perimeter network and enables connectivity through UC network(s) 110 with other users in one of the additional communication modes. UC servers 114 may include servers that perform combinations of the above described functionalities or specialized servers that only provide a particular functionality. For example, home servers providing presence functionality, routing servers providing routing functionality, and so on. Similarly, access server 112 may provide multiple functionalities such as firewall protection and connectivity, or only specific functionalities.

Audio/Video (A/V) conferencing server 118 provides audio and/or video conferencing capabilities by facilitating those over an internal or external network. Mediation server 116 mediates signaling and media to and from other types of networks such as a PSTN or a cellular network (e.g. calls through PBX 124 or from cellular phone 122). Mediation server 116 may also act as a Session Initiation Protocol (SIP) user agent.

In a UC system, users may have one or more identities, which is not necessarily limited to a phone number. The identity may take any form depending on the integrated networks, such as a telephone number, a Session Initiation Protocol (SIP) Uniform Resource Identifier (URI), or any other identifier. While any protocol may be used in a UC system, SIP is a preferred method.

SIP is an application-layer control (signaling) protocol for creating, modifying, and terminating sessions with one or more participants. It can be used to create two-party, multi-party, or multicast sessions that include Internet telephone calls, multimedia distribution, and multimedia conferences. SIP is designed to be independent of the underlying transport layer.

SIP clients may use Transport Control Protocol ("TCP") to connect to SIP servers and other SIP endpoints. SIP is primarily used in setting up and tearing down voice or video calls. However, it can be used in any application where session initiation is a requirement. These include event subscription and notification, terminal mobility, application/desktop sharing, and so on. Voice and/or video communications are typically done over separate session protocols, typically Real Time Protocol ("RTP"). One of the servers described above or a separate server may be responsible for employing ICE channels to facilitate remote desktop sharing and similar applications through RDP as discussed in more detail below.

While the example system in FIG. 1 has been described with specific components such as mediation server, A/V server, and similar devices, embodiments are not limited to these components or system configurations and can be implemented with other system configuration employing fewer or additional components. Functionality of systems facilitating desktop or application sharing may also be distributed among the components of the systems differently depending on component capabilities and system configurations.

Figure 2:
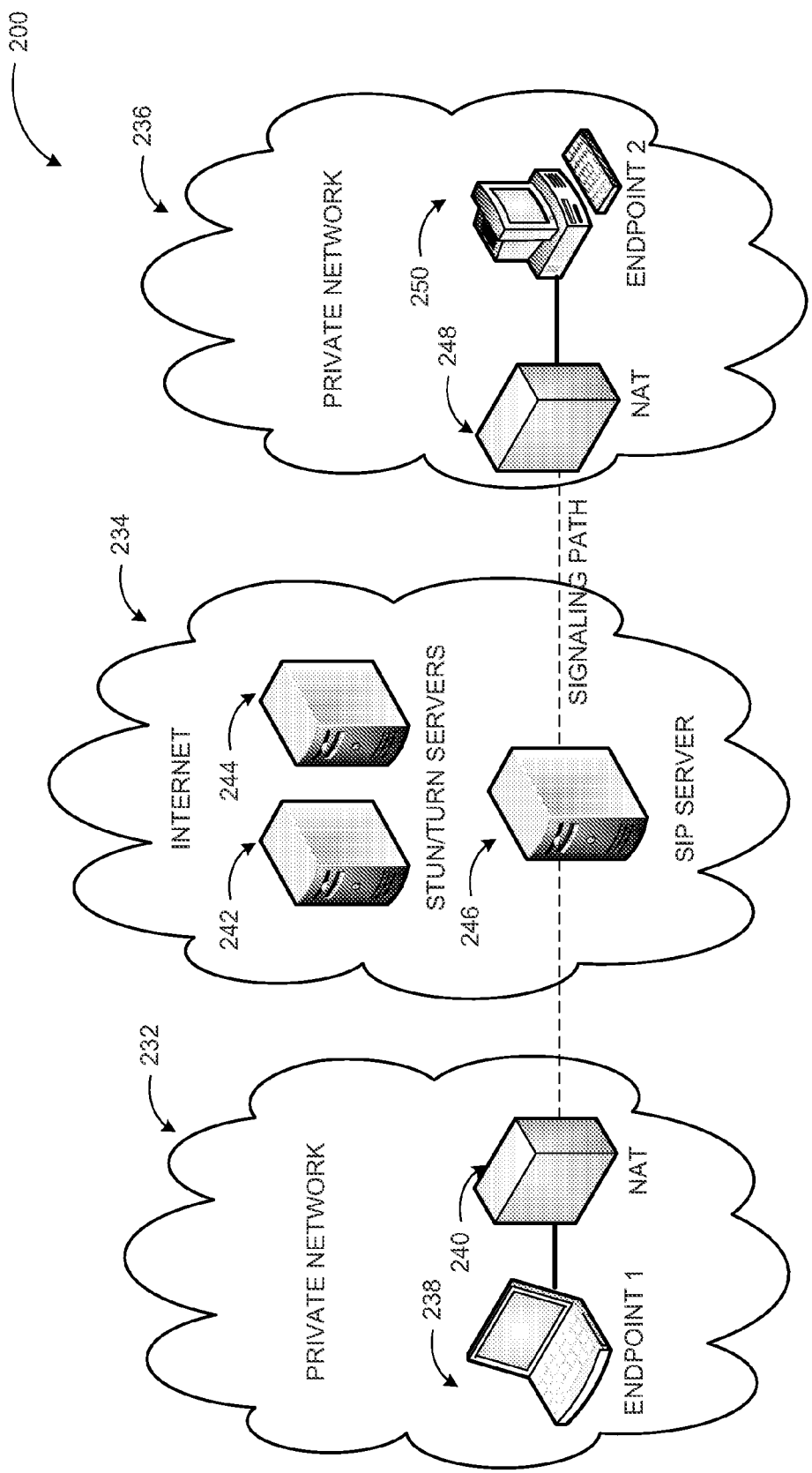
FIG. 2 illustrates an example system where ICE protocol may be employed for communication over multiple networks.

FIG. 2 illustrates an example system where ICE protocol may be employed for communication over multiple networks. The Real-time Transport Protocol (RTP) defines a standardized packet format for delivering audio and video over the Internet. RTP is frequently used in streaming media systems (together with the RTSP) as well as in videoconferencing and push to talk systems. For these it carries media streams controlled by SIP signaling protocols. RTP carries the media streams (e.g., audio and video) or out-of-band signaling (e.g. DTMF).

RTP is employed in multicast as well as unicast applications. For host-to-host transport, RTP uses the User Datagram Protocol (UDP) predominantly, although other Transport Layer protocols, in particular Datagram Congestion Control Protocol (DCCP) and Stream Control Transmission Protocol (SCTP) may be used because of their congestion control mechanisms. The protocols themselves do not provide mechanisms to ensure timely delivery. They also do not give any Quality of Service (QoS) guarantees. These are typically provided by some other mechanism. Real-time Transport Control Protocol (RTCP) is usually used in conjunction with RTP to monitor transmission statistics and quality of service information.

Remote Desktop Protocol (RDP) is a multichannel capable protocol that allows for separate virtual channels for carrying presentation data, serial device communication, licensing information, highly encrypted data (keyboard, mouse activity), and so on. RDP includes architectural features necessary to support multipoint (multiparty sessions). Multipoint data delivery allows data from an application to be delivered in "real-time" to multiple parties without having to send the same data to each session individually (for example, virtual whiteboards).

The Interactive Connectivity Establishment (ICE) provides a mechanism for Network Address Translator (NAT) traversal, using various techniques. In particular, it is used to allow SIP-based VoIP clients to successfully traverse the variety of firewalls that may exist between a remote user and a network. The Session Initiation Protocol (SIP), as described above, has seen widespread usage on the Internet for voice over IP (VoIP). It sets up, manages, and tears down calls with increasing usage. One of the challenges in employing SIP is traversal through NATs 240, 248 and through firewall devices, which have become commonplace on the Internet 234 and within private IP networks 232, 236.

ICE is a form of peer-to-peer NAT traversal that works as an extension to SIP. As briefly mentioned above, SIP is a successfully deployed and popular signaling protocol, but is not without difficulties. SIP was designed before NATs and firewall devices became common, and consequently, it does not operate successfully through NAT as originally specified.

A NAT (240, 248) operates by rewriting the IP addresses in the IP headers as packets pass from one interface to the other. When a packet is sent from the "inside" of the NAT toward the "outside" (e.g. private network 232 to Internet 234), the source IP address and port are rewritten from the address space on the inside (private IP address space) into the address space on the outside. Similarly, packets from the outside to the inside have the destination address and port rewritten from the address space on the outside to the one on the inside. Typically, NAT rewrites the addresses by maintaining a table of bindings that map each internal IP address and port to an external IP address and port. A binding is created dynamically when the first packet from a particular internal IP address and port arrives at the NAT.

Protocols such as SIP that carry IP addresses and ports in the payload of the packet itself, present a problem since the payload is typically not touched by the NAT. Thus, NAT may completely break the operation of SIP or similar protocols.

ICE provides NAT and firewall traversal capabilities for any type of session-oriented protocol, though it has been designed to work with SIP and its companion protocol, the Session Description Protocol (SDP). Simple Traversal of UDP through NAT (STUN) is a protocol that enables applications to discover the presence of and types of NATs and firewalls that exist between those applications and the public Internet. Traversal Using Relay NAT (TURN) protocol is designed to provide a mechanism to enable an endpoint (e.g. endpoints 238, 250) behind a NAT to acquire a transport address from a public server and to use the allocated transport address to receive data from a selected peer.

ICE makes use of STUN and TURN protocols employing STUN and TURN servers 242 and 244, and provides a unifying framework around them. Thus, SIP server 246 may manage remote desktop sharing and similar applications using RDP via the signaling path between multiple networks and overcome the NAT/firewall breakdowns by utilizing ICE channel(s).

Figure 3:
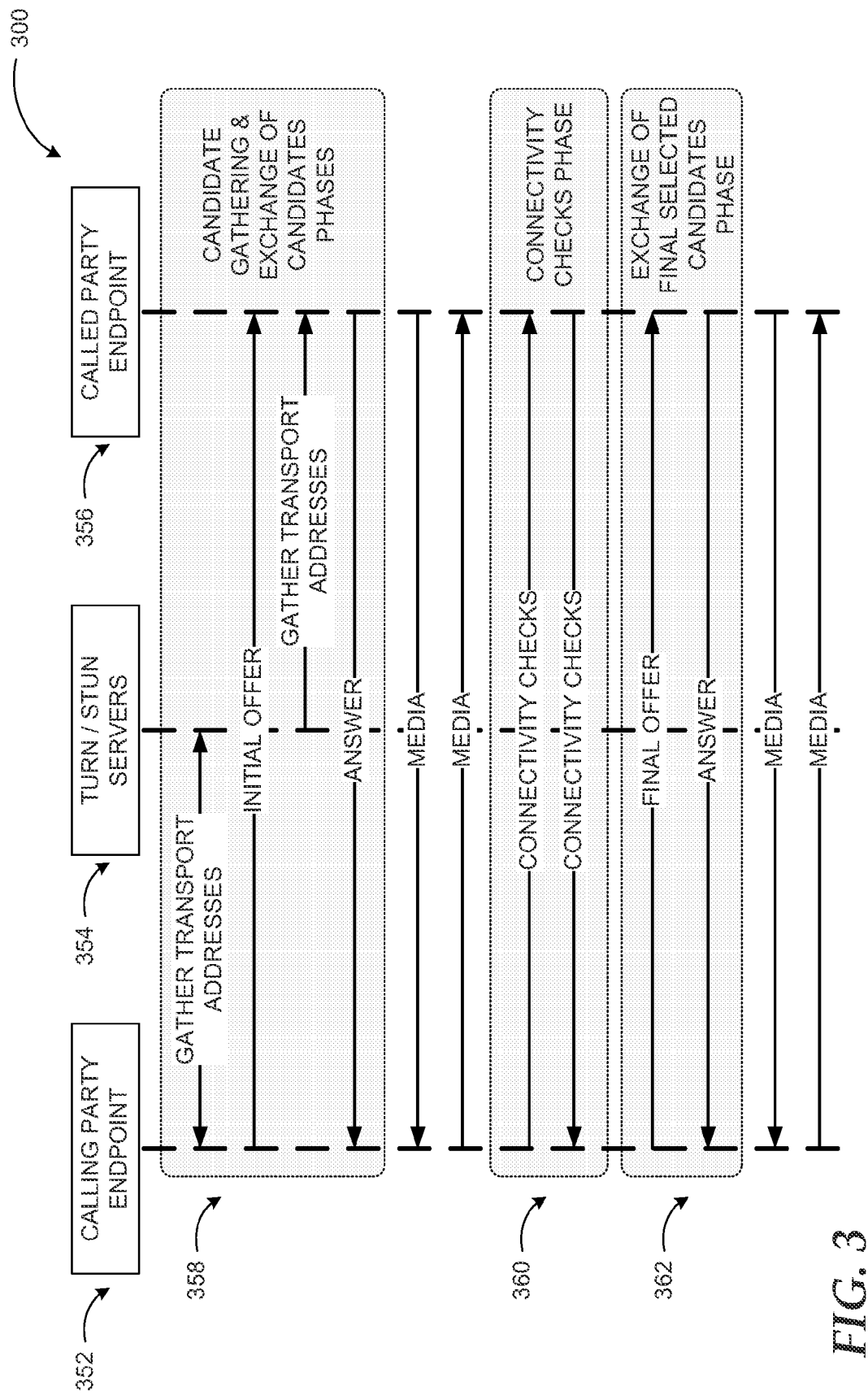
FIG. 3 is a sequence diagram illustrating sequence of actions employing ICE protocol in a system such as the system shown in FIG. 2.

FIG. 3 is a sequence diagram illustrating sequence of actions employing ICE protocol in a system such as the system shown in FIG. 2. As explained above, Interactive Connectivity Establishment (ICE) extensions protocol may be used to establish media flow between two endpoints in distinct networks. In typical deployments, NATs or firewalls might exist between the two endpoints that are intended to communicate. NATs and firewalls are deployed to provide private address space and to secure the private networks to which the endpoints belong. This type of deployment blocks incoming traffic. If the endpoint advertises its local interface address, the remote endpoint might not be able to reach it.

Advertising the address exposed by NAT or firewall is challenging as the endpoints would first need to determine the external routable mapping address created by the NAT (NAT-mapped address) for its local interface address. Moreover, NATs and firewalls may exhibit differing behavior in the way they create the NAT-mapped addresses. ICE provides a generic mechanism to assist media in traversing NATs and firewalls without requiring the endpoints to be aware of their network topologies. ICE assists media in traversing NATs and firewalls by gathering one or more transport addresses, which the two endpoints can potentially use to communicate, and then ICE determines which transport address is best for both endpoints to use to establish a media session.

Sequence diagram 300 outlines the various phases involved in establishing a session between two endpoints using the ICE Extensions protocol according to some embodiments.

During candidates gathering and exchange of candidates phase 358, the calling party endpoint 352 attempts to establish a media session and gathers transport addresses that can potentially be used to communicate with its peer (called party endpoint 356). The potential transport addresses may include: transport addresses obtained by binding to attached network interfaces (both physical interfaces as well as virtual interfaces like virtual private network "VPN"); transport addresses that are mappings on the public side of a NAT (a STUN-derived transport address); or transport addresses allocated from a TURN server 354 (a TURN-derived transport address).

The gathered transport addresses are used to form candidates. A candidate is a set of transport addresses that can be potentially used for media flow. For example, in the case of real-time media flow using RTP, each candidate consists of two transport addresses, one for RTP and another for RTCP. Each gathered candidate is assigned a unique identifier, called the candidate identifier and a priority value based on how they were obtained. This priority indicates the preference of an endpoint to use one candidate over another, if both candidates are reachable from the peer. Typically, candidates obtained from local network interfaces may be given a higher priority than the candidates obtained from TURN servers 354. The endpoint may also designate one of the gathered candidates as the default candidate based on local policy. The gathered candidates are then sent to the peer in the offer. The offer is typically encoded into an SDP message and exchanged over a signaling protocol such as SIP. The called party endpoint 356, after receiving the offer, follows the same procedure and gathers its candidates. The gathered candidates are encoded and sent to the caller in the answer.

The start of the connectivity checks phase 360 is triggered at an endpoint (e.g. 352) when it is aware of its peer's candidates. Both endpoints pair up the local and remote candidates to form a list of candidate pairs that are ordered based on the priorities of the candidates. The candidate pair that consists of the default local candidate and default remote candidate is designated as the default candidate pair. The default candidate pair is moved to the top of the candidate pair list. Both endpoints systematically perform "connectivity checks" starting from the top of the candidate pair list to determine the highest priority candidate pair that can be used by the endpoints for establishing a session. Connectivity checks involve sending peer-to-peer STUN Binding Request messages and responses from the local transport addresses to the remote transport addresses of each candidate pair in the list. Once a STUN Binding Request message is received and it generates a successful STUN Binding Response message for a candidate pair, it is considered "Send-Valid". Once a successful STUN Binding Response message is received for a STUN Binding Request message sent for the candidate pair, it is considered "Recv-Valid". A connectivity check for a candidate pair is considered to be "Valid" if a candidate pair is "Send-Valid" and "Recv-Valid". The endpoints can start streaming media from the local default candidate to the remote default candidate after the exchange of candidates is completed, even before the default candidate pair is validated by connectivity checks, but there is no guarantee that the media will reach the peer during this time.

With the exchange of transport addresses complete, both the endpoints are now aware of their peer's transport addresses and exchange of media may follow. In a system according to embodiments, RDP is utilized for exchanging remote desktop or similar application sharing media. RDP packets are tunneled through RTP using the ICE channel(s) as described here. The connectivity checks (360) for the transport address pairs may be spaced at regular intervals to avoid flooding the network. Depending on the topology, many of the possible candidate pairs might fail connectivity checks.

The endpoints may also discover new candidates during the connectivity check phase. This may happen in either of two scenarios: the STUN Binding Request message is received from a new transport address, or the STUN Binding Response message was from a request received from a new mapped transport address. These scenarios arise if new external mappings are created by the NATs residing between the endpoints. Connectivity checks are sent out on candidate pairs formed using these newly created candidates. These candidates may potentially be used for media flow as well. At the end of the connectivity checks phase 360, the calling party endpoint 352 may sends a final offer with only the best local and remote candidate selected during by the connectivity checks phase. The peer acknowledges the final offer with an answer (exchange of final selected candidates phase 362) and both endpoints start using the selected transport addresses for sending media.

Figure 4:
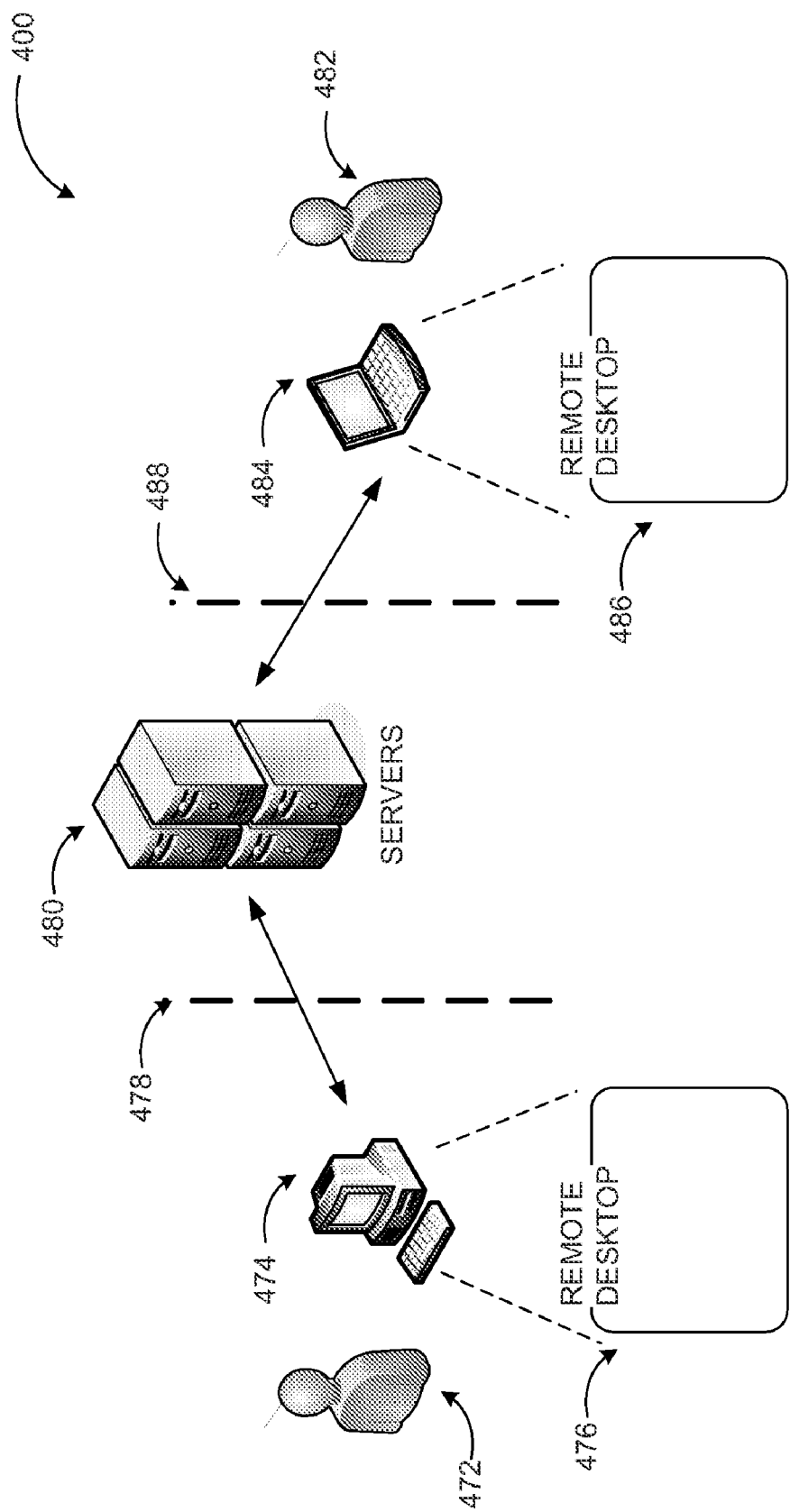
FIG. 4 is an example system where RDP packets may be tunneled through an ICE channel to facilitate desktop and/or application sharing according to embodiments.

FIG. 4 is an example system where RDP packets may be tunneled through an ICE channel to facilitate desktop and/or application sharing according to embodiments. According to some embodiments, ICE channels in conjunction with RTP are employed to exchange RDP packets for facilitating remote desktop sharing, and rather than selecting just STUN or just TURN for a particular call, a client may obtain IP addresses and ports by using both techniques, including both addresses—in addition to ports allocated from local interfaces—into the SIP call-setup messages.

Each of these addresses is called a candidate and represents a potential point of communications. When the SIP call-setup request arrives, the called party does the same thing, including numerous addresses in the SIP response. At that point, the agents begin a process of connectivity checks. These may be STUN messages sent from one agent to the other, probing to find a particular pair of addresses that work. Once a pair is found, the probes cease, and remote desktop sharing may start. The operations may be described in the three phases illustrated in FIG. 3 or further broken down to additional steps such as: gathering, prioritizing, encoding, offering and answering, checking, and completing.

According to an example scenario, the calling client application on computing device 474 for user 472 begins gathering IP addresses and ports, each of which is a potential candidate for communications. The first such candidate is gathered from interfaces on the host. If the host is associated with multiple homes, the client application may gather a candidate from each interface. Candidates from interfaces on the host (including virtual interfaces) are called host candidates. Next, the client application contacts a STUN server (servers 480) from each host interface. The result is a set of server-reflexive candidates. These are IP addresses that route to the outermost NAT (478) between the client application and the STUN server, which is typically on the public Internet. Finally, the client application obtains relayed candidates from TURN servers (servers 480). These IP addresses and ports reside on the relay servers. As an optimization, the TURN protocol allows a client to learn its relayed and server-reflexive candidates at the same time.

Once the client application has gathered its candidates, it may assign each of them a priority value. The priorities may be computed by means of a formula that combines preferences for types of candidates (where the types are host, relayed, and server reflexive) along with preferences for each host interface. Typically, the lowest priority may be given to the relayed candidates, since sending media through a relay is resource expensive. When a host is associated with multiple homes, it may prefer one interface to another for communications. For example, a VPN interface might be preferred to an Ethernet interface in order to keep intra-company communications on a private enterprise network.

With its candidates gathered and prioritized, the client application constructs its SIP INVITE request to set up the call. The body of the SIP request contains an SDP message that conveys the information needed for transmitting the media content of the call. This includes the types of media codecs, their parameters, and the IP addresses and ports to be used. ICE extends SDP by adding several new SDP attributes. The most important of them is the candidate attribute. For each media stream signaled in the SDP, there is a candidate attribute for each candidate the client application has gathered. The attribute contains the IP address and port for that candidate as well as the priority and type of candidate (host, server reflexive, or relayed). The SDP also contains credential information that is used to secure the STUN messaging, which will commence later. The SDP specifies the type of media to be exchanged which could be application/desktop sharing using RDP.

Once the calling endpoint has constructed its SIP INVITE request with the SDP payload, it sends the request to the called client application executed on computing device 484 for user 482. The SIP network delivers the request to the called client application. Assuming the called client application also supports ICE, the called client application performs the same gathering, prioritizing, and encoding that the caller performed. The called client application then generates a provisional SIP response. Such a response indicates to the calling client application that the request is being processed but that processing has not been completed. The provisional response contains an SDP with the candidates that the called client application has gathered. The SIP network delivers the provisional response to the calling client application.

Following the exchange of SDP messages, each client application is aware of the set of candidates for each media stream that will make up the call (there may be more than one media stream such as multiple applications in the remote desktop sharing, additional audio or video lines, etc.). In the next step, ICE performs the bulk of its work. Each client application pairs each of its candidates with a candidate from its peer. The result is a list of candidate pairs. Each agent computes a priority for the candidate pair by combining the priority of each candidate in the pair. If multiple candidate pairs work, the objective is to select the highest-priority pair. Since the priority of each candidate (and consequently, the pair) is largest for those with fewest intermediate relays (whether they are a NAT or a TURN server), the highest-priority pair is also the one that provides the most direct path for media traffic.

To verify that a candidate pair works, ICE may utilize a STUN transaction from each client application towards the other, called a connectivity check. The STUN transaction uses the IP addresses and ports in the candidate pair—the same IP addresses and ports that will be used for the transmission of media. Since the STUN transactions are sent on the same IP addresses and ports that will eventually be used for media traffic, there may be a need to de-multiplex the STUN and media. Since the number of candidate pairs grows by the square of the number of candidates, the performing of the checks for each pair in parallel is problematic. Instead, ICE may perform the checks sequentially. The candidate pairs are ordered by priority, and periodically, each client application may generate a STUN transaction for the next pair in the list.

Upon completion of the checks, one of the client applications, typically the caller, may generate a final check toward the other client application, confirming that the pair is the one selected. This allows for each client application to unambiguously communicate which pair will ultimately be used for media. Once this final transaction has been sent, the called client application may initiate the remote desktop sharing (486). Upon initiation of the remote desktop sharing at the called side, the calling client application may provide user 472 with the requisite user interface(s) for remote desktop sharing (476).

Embodiments are not limited to unified communication systems. The approaches discussed here may be applied to any data exchange in a networked communication environment using the principles described herein. Furthermore, UC systems, as mentioned above, are provided as an example environment. Embodiments may be implemented in any networked communication environment such as a cellular data network.

The above discussed scenarios, example systems, exchange mechanisms, or applications are for illustration purposes. Embodiments are not restricted to those examples. Other forms of data, exchange signaling, and applications may be used in implementing tunneling of remote desktop sessions through firewalls and NATs in a similar manner using the principles described herein. It should be noted that ICE may be employed even when there are no NATs or firewall between endpoints.

Figure 5:
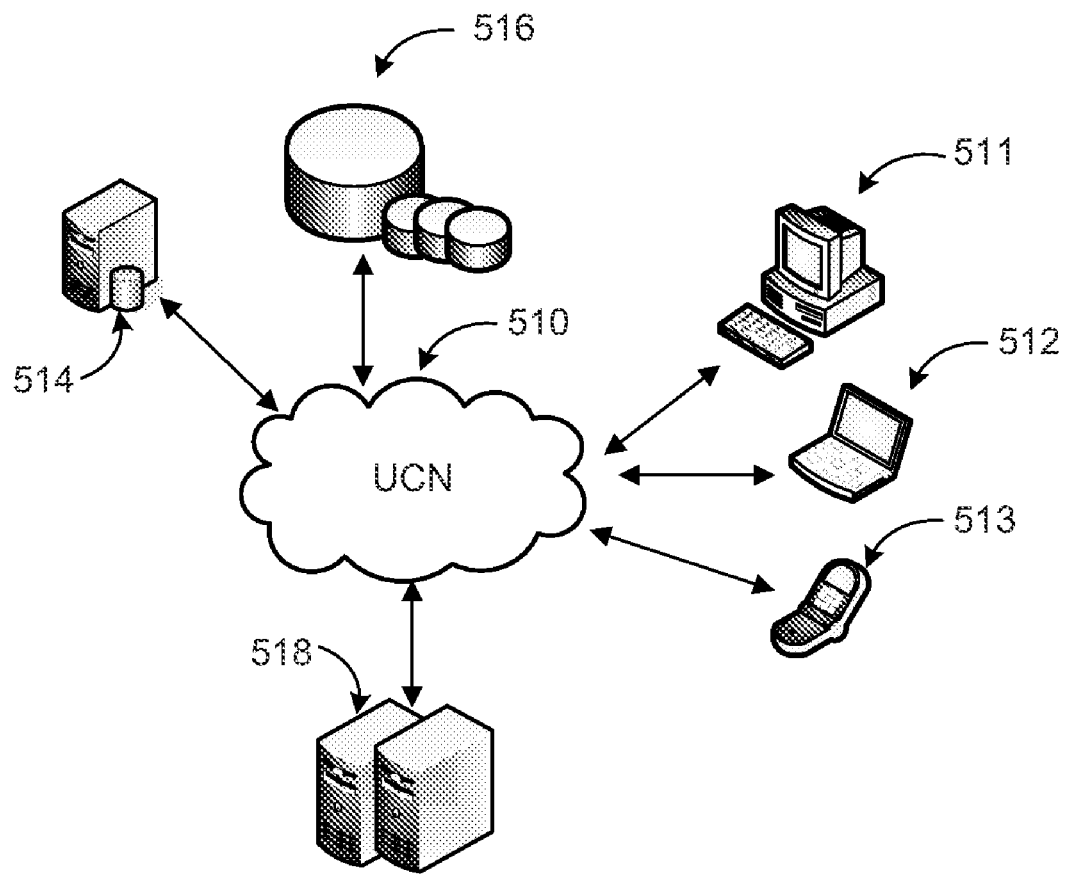
FIG. 5 is a networked environment, where a system according to embodiments may be implemented.

FIG. 5 is an example networked environment, where embodiments may be implemented. A platform providing unified communication services may be implemented via software executed over one or more servers 518 such as a hosted service. The platform may communicate with client applications on individual computing devices such as a cellular phone 513, a laptop computer 512, and desktop computer 511 (client devices) through network(s) 510.

As discussed above, modern communication technologies such as UC services enable subscribers to utilize a wide range of computing device and application capabilities in conjunction with communication services. This means, a subscriber may use one or more devices (e.g. a regular phone, a smart phone, a computer, a smart automobile console, etc.) to facilitate communications. Depending on the capabilities of each device and applications available on each device, additional services may be enabled in conjunction with the available communications. Furthermore, a variety of communication modes such as voice communication, video communication, instant messaging, electronic mail, data sharing, application sharing, white-boarding, and similar modes, may be available depending on the capabilities of each device and applications available on each device. Desktop and application sharing between participating computing devices may be facilitated employing RDP tunneling through ICE channels according to some embodiments as explained in more detail above. Information associated with subscribers and facilitating communications such as desktop or application sharing may be stored in one or more data stores (e.g. data store 516), which may be managed by any one of the servers 518 or by database server 514.

Network(s) 510 may comprise any topology of servers, clients, Internet service providers, and communication media. A system according to embodiments may have a static or dynamic topology. Network(s) 510 may include a secure network such as an enterprise network, an unsecure network such as a wireless open network, or the Internet. Network(s) 510 may also coordinate communication over other networks such as PSTN or cellular networks. Network(s) 510 provides communication between the nodes described herein. By way of example, and not limitation, network(s) 510 may include wireless media such as acoustic, RF, infrared and other wireless media.

Many other configurations of computing devices, applications, data sources, and data distribution systems may be employed to implement a system for facilitating desktop or application sharing. Furthermore, the networked environments discussed in FIG. 5 are for illustration purposes only. Embodiments are not limited to the example applications, modules, or processes.

Figure 6:
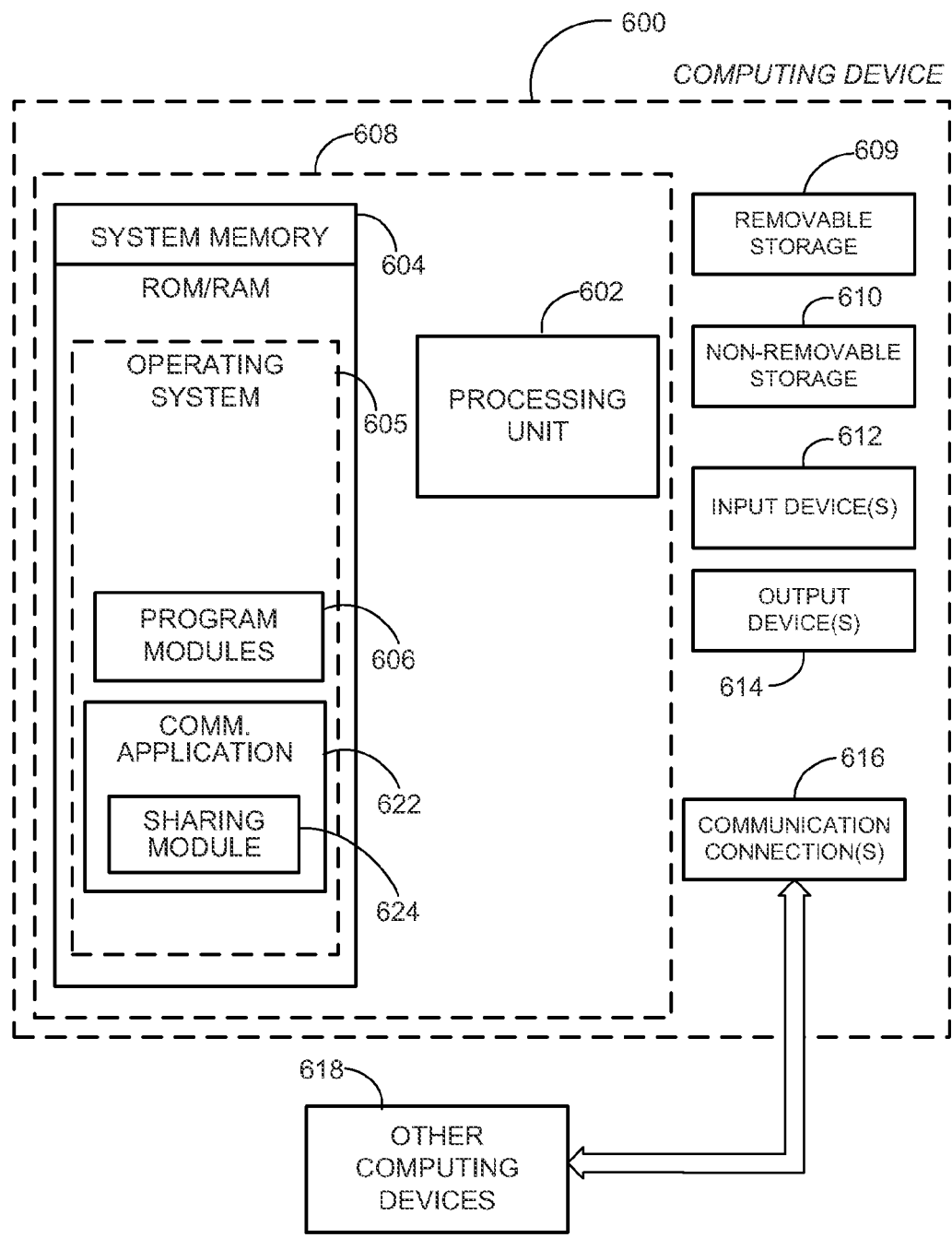
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may be a server in a unified communication system and include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating systems from MICROSOFT CORPORATION of Redmond, Wash. The system memory 604 may also include one or more software applications such as program modules 606, communication application 622, and sharing module 624.

Communication application 622 may be any application that can facilitate multi-modal communications including desktop and application sharing such as those listed previously. Sharing module 624 may enable desktop or application sharing by employing tunneling of RDP packets through an ICE channel. Sharing module 624 and communication application 622 may be separate applications or integral modules of a hosted service that provides enhanced communication services to client applications/devices. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other storage medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wireless network in a distributed computing environment, a satellite link, a cellular link, and comparable mechanisms. Other devices 618 may include computer device(s) that execute communication applications. Communication connection(s) 616 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
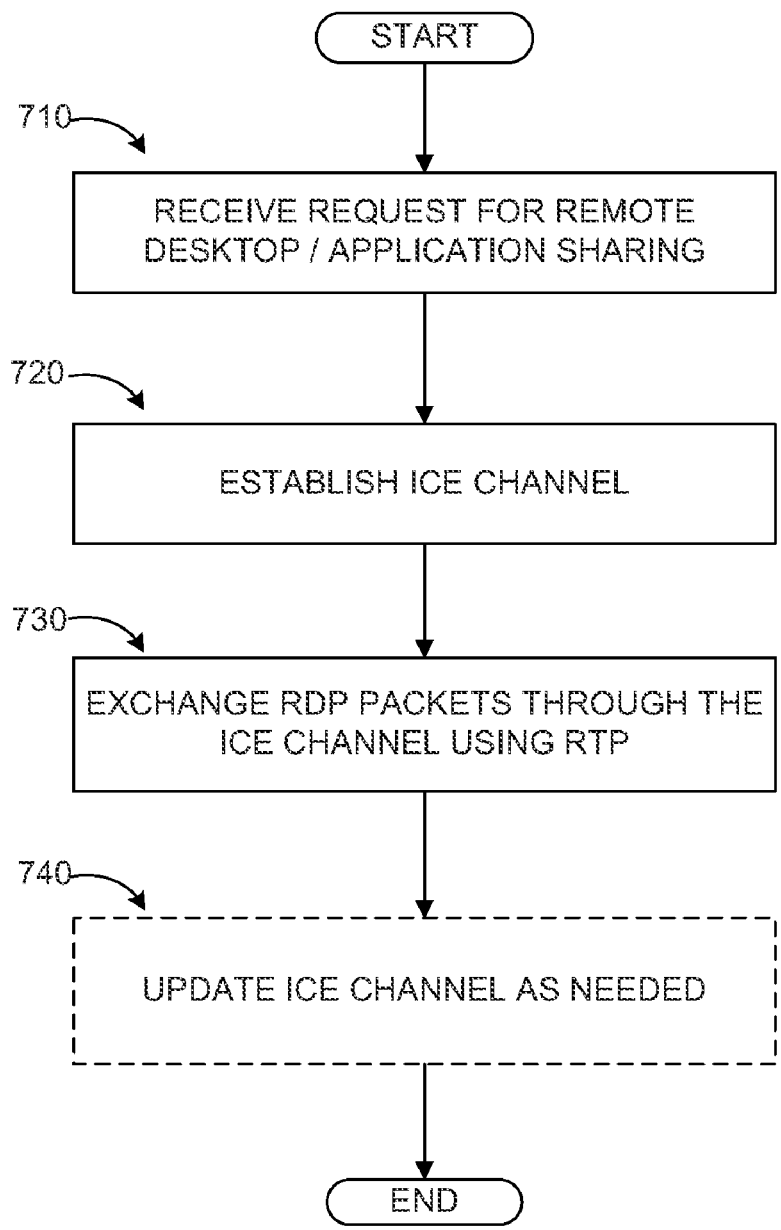
FIG. 7 illustrates a logic flow diagram for tunneling RDP packets through an ICE channel to facilitate desktop and/or application sharing according to embodiments.

FIG. 7 illustrates a logic flow diagram 700 for facilitating desktop or application sharing according to embodiments. Process 700 may be implemented as part of an enhanced communication system.

Process 700 begins with operation 710, where a request for a remote desktop or application sharing is received from a client application. In response to the request, the called client application(s) is (are) notified and an ICE channel is established at operation 720 as discussed in detail above. The establishment of the ICE channel includes several phases such as candidate gathering, prioritization, exchange of final candidates, and comparable ones.

Remote desktop/application sharing sessions are facilitated using remote desktop protocol. Instead of typical media exchange through RTP and ICE channel to traverse NATs or firewalls between networks, RDP packets for the remote desktop session are exchanged between the participating client applications at operation 730. As mentioned previously, the ICE channel(s) may be updated during the session and different candidate pairs may be utilized for the connection based on network conditions, prioritization, etc. at optional 740.

The operations included in process 700 are for illustration purposes. RDP tunneling through an ICE channel to facilitate desktop sharing and application sharing over multiple networks may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for facilitating remote desktop and application sharing between applications over a plurality of networks, the method comprising:

receiving a request for one of a remote desktop sharing and an application sharing session from a first application, wherein the request is addressed to a second application that is separated from the first application;

establishing an Interactive Connectivity Establishment (ICE) channel through Real-time Transport Protocol (RTP) for exchanging data packets to facilitate the sharing session;

exchanging Remote Desktop Protocol (RDP) packets through the established ICE channel by tunneling the RDP packets through RTP to facilitate the sharing session;

gathering Internet Protocol (IP) addresses and ports from Simple Traversal of UDP through NAT (STUN) servers for each interface that is employable for establishing the sharing session as STUN derived transport addresses;

gathering a plurality of transport addresses from bindings to a plurality of attached network interfaces;

determining candidates for establishing the session based on the bindings and STUN derived transport addresses;

prioritizing the candidates based on the bindings derived transport addresses higher than the STUN derived transport addresses;

gathering IP addresses and ports from Traversal of UDP through NAT (TURN) servers employable for establishing the sharing session as TURN derived transport addresses;

determining candidates for establishing the session based on the bindings, STUN and TURN derived transport addresses;

prioritizing the candidates secondarily based on application defined parameters; and updating the established ICE channel in response to a change in at least one of network conditions and application requests.

2. The method of claim 1, further comprising:

comparing prioritized candidate lists between the first and second applications via an offer and answer exchange;

performing a plurality of connectivity checks to verify reliable connection between prioritized candidate pairs of the first and second applications.

3. The method of claim 2, wherein a candidate pair is selected through a final offer—final answer exchange for establishing the sessions upon completion of the connectivity checks.

4. The method of claim 1, wherein the prioritized candidate lists are updated in response to one of: a candidate pair failing a connectivity check and discovering a new candidate.

5. The method of claim 1, wherein the plurality of attached network interfaces include physical and virtual interfaces.

6. The method of claim 1, further comprising:
continuing to perform connectivity checks at regular intervals during the session.

7. The method of claim 1, wherein the interfaces further include a virtual private network interface.

8. The method of claim 1, wherein the request is addressed to a plurality of applications, and wherein a portion of the plurality of applications are associated with distinct networks with respective NATs and firewalls.

9. The method of claim 1, wherein the first and the second applications are separated by at least one of a firewall and a Network Address Translator (NAT).

10. The method of claim 1, wherein the first and the second applications are one of: a client application and a server application.

11. A mediation server in a unified communication (UC) system for facilitating remote desktop and application sharing between user endpoints over a plurality of networks, the server comprising:
a memory for storing computer-executable instructions;
a processor coupled to the memory, the processor configured to execute instructions to cause actions including:
facilitate communication between a first user endpoint and a plurality of bindings to a plurality of attached network interfaces, STUN, and TURN servers to enable the first endpoint gather transport addresses for determining a first set of candidate paths to establish a sharing session;
prioritize transport addresses from bindings to the plurality of network interfaces higher than transport addresses from STUN and TURN servers;
upon receiving an offer from the first endpoint to a second endpoint with the first endpoint's candidate list, facilitate communication between the second endpoint and the bindings to the plurality of network interfaces, STUN and TURN servers to enable the second endpoint gather transport addresses for determining a second set of candidate paths based on the bindings, STUN and TURN derived transport addresses to establish the sharing session;
prioritize the second set of candidates based on application defined parameters;
enable the first endpoint and the second endpoint to determine a prioritized list of candidate pairs list, wherein the first and the second endpoints reside on distinct networks; and
upon the first and second endpoints reaching an agreement on a candidate pair, enable establishment of an ICE channel through RTP for exchanging RDP data packets to facilitate the sharing session.

12. The server of claim 11, wherein the processor is further configured to enable the first and second endpoints perform a plurality of connectivity checks prior to reaching the agreement on the candidate pair for the ICE channel and during the session to update the established ICE channel.

13. The server of claim 12, wherein the connectivity checks include exchange of STUN Binding Request messages and STUN Binding Response messages, and wherein a candidate pair is determined to be valid upon successful exchange of a STUN Binding Request and STUN Binding Response message pair.

14. The server of claim 11, wherein the server communicates with the first and second endpoints over the Internet, and wherein the first and second endpoints reside on private networks separated by at least one of: a NAT and a firewall.

15. The server of claim 11, wherein the sharing session is established between at least two from a set of: a communication application, a calendaring/scheduling application, a word processing application, a spreadsheet application, a white-boarding application, a database application, a partial desktop sharing application, and a complete desktop sharing application.

16. A computer-readable memory device with instructions stored thereon for facilitating remote desktop and application sharing between user endpoints over a plurality of networks, the instructions comprising:
receiving a request for one of a remote desktop sharing and an application sharing session from a first endpoint, wherein the request is addressed to a second endpoint that is separated from the first endpoint by at least one NAT and one firewall;
enabling the first endpoint to determine a first set of candidate paths by:
gathering IP addresses and ports from STUN servers for each interface that is employable for establishing the sharing session as STUN derived transport addresses;
gathering IP addresses and ports from TURN servers employable for establishing the sharing session as TURN derived transport addresses;
gathering a plurality of transport addresses from bindings to a plurality of attached network interfaces as bindings derived transport addresses;
prioritizing the bindings derived transport addresses higher than STUN and TURN derived transport addresses;
forwarding the first set of candidate paths to the second endpoint in an offer message;
enabling the second endpoint to determine a second set of candidate paths by:
gathering IP addresses and ports from STUN servers for each interface that is employable for establishing the sharing session as STUN derived transport addresses;
gathering IP addresses and ports from TURN servers employable for establishing the sharing session as TURN derived transport addresses;
determining the second set of candidate paths for establishing the session based on the bindings, STUN and TURN derived transport addresses;
prioritizing the second set of candidate paths based on application defined parameters;
forwarding the second set of candidate paths to the first endpoint in an answer message; and
enabling establishment of an ICE channel through RTP for exchanging RDP data packets to facilitate the sharing session upon the first and second endpoints reaching an agreement on a candidate path pair.

17. The computer-readable memory device of claim 16, wherein the instructions further comprise:
updating the established ICE channel in response to a change in at least one from a set of: network conditions, participations of an additional endpoint in the sharing session, and an endpoint request.

18. The computer-readable memory device of claim 16, wherein each gathered candidate path is assigned a unique identifier and a priority value based on how it is obtained.

19. The computer-readable memory device of claim 18, wherein candidate paths obtained from local network interfaces are assigned a higher priority than the candidate paths obtained from TURN servers.

* * * * *

UNITED STATES PATENT AND TRADEMARK OFFICE
CERTIFICATE OF CORRECTION

PATENT NO. : 7,941,551 B2  Page 1 of 1
APPLICATION NO. : 12/392902
DATED : May 10, 2011
INVENTOR(S) : Sundar Anantharaman It is certified that error appears in the above-identified patent and that said Letters Patent is hereby corrected as shown below:

In Drawing, Sheet 7 of 7, Fig. 7, line 1, above "Reference Numeral 710" insert

-- --.

Signed and Sealed this
Nineteenth Day of July, 2011

David J. Kappos
*Director of the United States Patent and Trademark Office*